Jan. 15, 1935.  R. E. KING  1,988,319
FOOD PRESERVATION
Filed Feb. 27, 1932
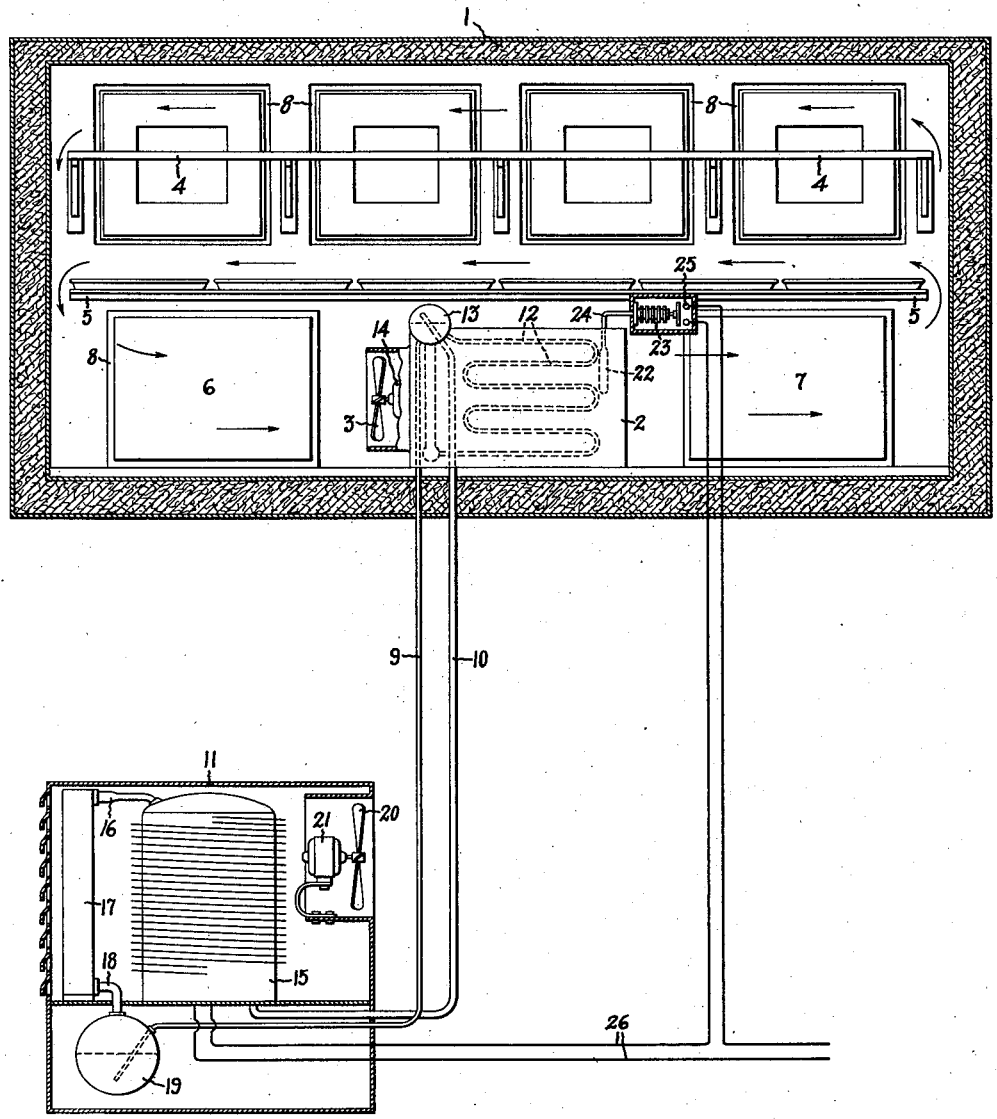
Inventor:
Ralph E. King,
by Charles W. Tullar
His Attorney.

Patented Jan. 15, 1935

1,988,319

UNITED STATES PATENT OFFICE 1,988,319

FOOD PRESERVATION

Ralph E. King, Fort Wayne, Ind., assignor to General Electric Company, a corporation of New York Application February 27, 1932, Serial No. 595,552

14 Claims. (Cl. 62—171)

My invention relates to the preservation of perishable food products by means of refrigeration. I have found that by properly relating temperature, humidity and rate of air circulation in the food storage compartments of refrigerating apparatus, food-stuffs may be kept therein in a wholesome and presentable condition for much longer periods of time than are now obtained by present methods of refrigeration.

Not all foods require the same temperatures and relative humidities to guarantee their preservation for a reasonable length of time. Since meats are usually kept in cabinets for longer periods of time than vegetables, proper air conditioning should be determined particularly for the preservation of meats, and particularly small cuts of meat.

Food preservation depends primarily on the prevention of the growth of harmful bacteria. The rate of this growth increases with the temperature. Spoilage of perishable food due to shrinkage, discoloration, and transfer of food odors depends primarily on the humidity of the atmosphere in the storage cabinet. Air of relative humidity approaching saturation causes meats to become slimy and odoriferous. Meats maintained at a temperature of 38° F. in air at 95 per cent relative humidity tend to discolor on the third day of storage and are odoriferous, slimy, and unsalable after approximately four days' storage. Meats maintained at 55° F. in air of 70 per cent relative humidity, the condition usually found in the average refrigerator cooled by ice, start to spoil and discolor on the second day of storage. The spoilage in this case is due primarily to the rate of bacterial growth at 55° F. which is very rapid. Meats maintained at 45° F. in air whose relative humidity is about 60 per cent, conditions which exist in the average mechanical or chemical refrigeration installation, are rapidly dehydrated. Under these conditions discoloration starts in the second day of storage, and the meat becomes unsalable due to its appearance by the end of the third day.

Most foods are constantly giving off odors and these are absorbed by the air in the refrigerator cabinet. As this air circulates or moves slowly through the refrigerator and passes over other foods, odor contamination takes place. Odor transfer, I have found, is largely due to the lack of any method of removing odors from the air in the refrigerator. According to my invention a rapid circulation of air is set up in the refrigerator and this air is caused to pass over a cooling element in the refrigerator which is operated periodically above and below the freezing point to maintain an average temperature close to the temperature of the refrigerator cabinet in order to produce therein a relative humidity of from 80 to 85 per cent. Under these conditions odors taken up by the circulating air from the food stored in the refrigerating compartment condense out with the excess moisture in the air on the moist surfaces of the cooling element and pass from the refrigerating chamber with the condensed moisture through a drain pipe provided for that purpose. This continual washing of the air by passing it over the moist surface of the cooling element keeps the air relatively free from odors and provides a means for constantly purifying the air in the refrigerator. This effect is enhanced by the ventilation obtained through air spillage upon opening the doors of the cabinet for the insertion and removal of material, although other means may be provided or relied on for securing a ventilation of the cabinet.

The desirability of circulating air in a food storage cabinet has been recognized and has been resorted to for obtaining a uniform temperature distribution therein, but attempts to cool foods by forced convection have always resulted in dehydration of the food-stuffs. The desirability of preventing tainting of foods by odor transfer has also been recognized, but air motion in the refrigerator has been believed to be responsible for this transfer. I have found that although dehydration of foods is proportional to the velocity of the air circulating over them, dehydration is more affected by the humidity of the air, and that air motion does not seem to contribute to the transfer of odors from one food to another stored in the same cabinet, but that humidity is largely responsible for this condition. Moving air may be passed across foods in a cabinet without seriously dehydrating them if the relative humidity of the air is from 80 to 85 per cent. Air of this relative humidity will also prevent the transfer of tastes or odors from one food to another if means are provided for removing odors from the cabinet. The velocities of the circulating air may vary from 20 to 300 feet per minute without seriously dehydrating the food when the relative humidity is between 80 and 85 per cent. The most desirable rate of air circulation, however, is about 30 feet per minute. By maintaining the temperature within the refrigerator cabinet between 35 and 40° F., I find that the temperature is low enough to almost stop bacterial growth for at least seven days, and even after this period greatly retard the rate of growth. This temperature is also suitable for preserving vegetables without destroying them by freezing.

Consequently, in accordance with my invention the food storage compartment of a refrigerating apparatus is maintained at a temperature between 35 and 40° F. in air having a relative humidity of from 80 to 85 per cent which is circulating over the food-stuffs at approximately 30 feet per minute.

It is an object of my invention to provide an improved method of refrigeration by means of which perishable food products may be kept in an edible and presentable condition for long periods of time.

It is a further object of my invention to provide refrigerating apparatus in which the cooling element is operated at a temperature very close to the temperature of the food storage cabinet to produce therein a high relative humidity.

It is a further object of my invention to operate a refrigerator of the character above described by periodically maintaining the temperature of the cooling element above and below the freezing point while positively circulating air over the cooling element and through the cabinet at a rate greater than will be obtained by natural circulation due to convection.

Further objects of my invention will become apparent from a consideration of the following description taken in connection with the accompanying drawing which illustrates apparatus for carrying it into effect.

As an example of one manner of carrying out my invention, the drawing illustrates a refrigerated display cabinet 1 such as used in stores and restaurants. The air in this cabinet is properly conditioned as to temperature and humidity by a cooling element 2 over which it is circulated by means of a fan 3. The cabinet is provided with shelves 4 and 5 and compartments 6 and 7 for the display and storage of the material to be refrigerated, which in most cases will be perishable food-stuffs. These food-stuffs are placed in and removed from the cabinet through doors 8, which are located to provide convenient access to the shelves and compartments of the cabinet.

The refrigerating system illustrated in the drawing is of the mechanical type, the cooling element 2 being an evaporator to which liquid refrigerant is supplied by a pipe 9 and from which gas is returned by a pipe 10 to a compressor and condenser unit 11. The evaporator comprises a plurality of pipe coils 12 connected to a header 13 to which pipes 9 and 10 are also connected. The fan 3, associated with the evaporator, is driven by an electric motor 14.

The compressor and condenser unit 11 comprises a finned shell 15 totally enclosing a compressor and an electric motor for driving the same. Compressed gas is supplied from the shell 15 through a pipe 16 to a condenser 17 from which it is discharged as a liquid through a pipe 18 to a receiver 19. Liquid refrigerant is supplied to the evaporator from this receiver through pipe 9 referred to above. The several parts constituting the compressor and condenser unit are enclosed in a vented cabinet through which a positive air circulation is obtained by means of a fan 20 operated by an electric motor 21 located within the same.

The operation of the compressor motor is under the control of a thermostatic switch having its temperature responsive element associated with the cooling element 2. This thermostatic switch may comprise, as illustrated, a liquid-containing bulb 22 in contact with the cooling element 2 and a bellows 23 connected thereto by means of a pipe 24 in such manner that upon the expansion and contraction, or vaporization and condensation, of the liquid in the bulb 22 the bellows 23 is expanded and contracted, thereby closing and opening switch contacts 25 in the circuit 26 of the compressor motor located in the shell 15. In accordance with one embodiment of my invention the thermostatic switch is so adjusted that when the temperature of the evaporator decreases below 30°, the compressor motor is deenergized and is not energized again until its temperature rises to about 35° F.

Fan 20 associated with the motor-compressor unit is preferably started and stopped conjointly with the compressor motor, but may be maintained in continuous operation. The fan 3 associated with the evaporator should be maintained in continuous operation in order to circulate air over the cooling element and through the cabinet.

According to my invention, the surfaces of the cooling element 2 are proportioned relative to the rate of air circulation in cabinet 1 to produce in said cabinet a temperature of between 35 and 40° F. when the cooling element is operated at temperatures between 29 and 35° F. with a forced circulation of air, although I prefer to circulate the air at a velocity between 20 and 300 feet per minute. By thus maintaining the temperature of the cooling element very close to the cabinet temperature, I am enabled to maintain the humidity of the air in the cabinet at the most desirable value, namely, from 80 to 85 per cent.

The amount of moisture that a given quantity of air is capable of absorbing depends upon and decreases with the temperature of the air. As the air circulates or is circulated in a refrigerator cabinet, it continually passes over the cooling element and is cooled to within a few degrees of its temperature. When the air is cooled to its dew point moisture condenses on the cooling element, and the lower the temperature to which the air is cooled, the greater the amount of moisture deposited thereon. Therefore, the lower the operating temperature of the cooling element relative to the temperature of the cabinet, the more moisture will be taken from the air in the cabinet and consequently the lower will be its relative humidity. In order to maintain the high relative humidity required in accordance with my invention, the cooling element should be designed so that it will operate at a temperature very close to that of the cabinet air temperature. For example, if it is operated between temperatures of 29 and 35° F. when maintaining a cabinet temperature of between 35 and 40° F., which I find is low enough to greatly inhibit rapid bacteria growth for at least seven days and even after this period retard the rate of growth, a relative humidity of from 80 to 85 per cent will be obtained which is high enough to prevent excessive dehydration of small cuts of meat, while yet not sufficient to cause the meats to become slimy.

I prefer to operate the cooling element of a refrigerator embodying my invention on a defrosting cycle, that is, periodically above and below the freezing point, 32° F. When so operated, its surfaces become wet due to the condensation of vapor thereon. As the air in the cabinet is circulated over these wet surfaces, food odors and waste gases from the food products stored in the cabinet are absorbed by the liquid thereon and pass from the cabinet with this liquid as it is discharged from the cabinet through the drain pipe. In this way, the air in the cabinet is kept fresh and clean. With a forced air circulation, such as required in accordance with my invention, food odors are taken away so rapidly that there is no transfer of odors from one food to another. Furthermore, humidities of from 80 to 85 per cent, such as are maintained in a cabinet in accordance with my invention, are not sufficient to permit taste and odors to transfer readily from one food to another.

A rapid air circulation such as employed in accordance with my invention increases the efficiency of the cooling element many times with the result that an average cabinet temperature of 38° F. can be obtained with a cooling element operating at an average temperature of about 30° F. The forced air circulation also produces a more uniform temperature in the cabinet and aids in the rapid cooling of warm foods placed therein. By maintaining the air at a relative humidity of from 80 to 85 per cent the velocity of the air may be as great as 300 feet per minute without seriously dehydrating food-stuffs stored in the cabinet. Although dehydration of foods is proportionate to the air velocity, I have found that dehydration of foods is more affected by the humidity, and that by properly maintaining the humidity within the limits of 80 to 85 per cent, a rapid circulation of air may be maintained without spoiling the appearance or quality of food-stuffs stored in the cabinet. With a humidity of from 80 to 85 per cent, odor transfer is greatly retarded and any tendency toward odor transfer is effectively eliminated by positively circulating the air over the wet surfaces of the cooling element. By circulating air having a temperature between 35 and 40° F. and a relative humidity of 80 to 85 per cent at velocities between 20 and 300 feet per minute, in accordance with my invention food-stuffs may be kept in a wholesome and presentable condition for seven days or more, a much longer period of time than is possible with operating conditions such as are presently maintained in refrigerator cabinets.

It is contemplated that my invention will find its greatest utility when applied to display cases and food storage cabinets since when foods are kept for immediate consumption at temperatures between 35 and 40°, it is maintained at too low a temperature to be palatable. For domestic cabinets, temperatures of between 40 and 45° F. are sufficient to guarantee preservation of food for several days. A relative humidity of between 80 and 85 per cent in such cabinets will however prevent serious dehydration, and will prove desirable for use in this type of refrigeration.

What I claim as new and desire to secure by Letters Patent of the United States is:

1. The method of preserving meat by refrigeration which comprises circulating over the meat to be preserved at velocities between 20 and 300 feet per minute air having a temperature between 35 and 40° F. and a relative humidity between 80 and 85 per cent.

2. The method of operating a refrigerator in which the food storage cabinet is cooled by circulating air over a cooling element and through said cabinet which comprises maintaining the temperature of the cooling element sufficiently close to the temperature of the air in said cabinet to produce a relative humidity of the air in said cabinet of from 80 to 85 per cent.

3. In a refrigerator in which the cooling element is designed for operation at a temperature close to the operating temperature of the storage cabinet, the method of operation which comprises maintaining the temperature of the cooling element periodically above and below 32° F., maintaining the temperature of the cabinet between 35 and 40° F. and circulating air over said cooling element and through said cabinet at velocities between 20 and 300 feet per minute.

4. The method of operating a refrigerator in which the food storage cabinet is cooled by circulating air over a cooling element and through said cabinet which comprises circulating the air in said cabinet at velocities between 20 and 300 feet per minute and maintaining the temperature of the cooling element sufficiently close to the temperature of the air in said cabinet to produce a relative humidity of the air in said cabinet of from 80 to 85 per cent.

5. The method of operating a refrigerator in which the food storage cabinet is cooled by circulating air over a cooling element and through said cabinet which comprises circulating the air in said cabinet at a velocity of approximately 30 feet per minute and maintaining the temperature of the cooling element sufficiently close to the temperature of the air in said cabinet to produce a relative humidity of the air in said cabinet of from 80 to 85 per cent.

6. The method of operating a refrigerator in which the food storage cabinet is cooled by circulating air over a cooling element and through said cabinet which comprises circulating the air in said cabinet at velocities between 20 and 300 feet per minute and maintaining the temperature of the cooling element periodically above and below 32° F. and sufficiently close to the temperature of the air in said cabinet to produce a relative humidity of the air in said cabinet of from 80 to 85 per cent.

7. The method of operating a refrigerator in which the food storage cabinet is cooled by circulating air over a cooling element and through said cabinet which comprises circulating the air in said cabinet at a velocity of approximately 30 feet per minute and maintaining the temperature of the cooling element periodically above and below 32° F. and sufficiently close to the temperature of the air in said cabinet to produce a relative humidity of the air in said cabinet of from 80 to 85 per cent.

8. In a refrigerator in which the cooling element is designed for operating at a temperature close to the operating temperature of the storage cabinet, the method of operation which comprises operating the cooling element at temperatures between 29° and 35° F., maintaining the temperature of the cabinet between 35° and 40° F. and circulating air over said cooling element and through said cabinet at velocities between 20 and 300 feet per minute.

9. In a refrigerator in which the cooling element is designed for operation at a temperature close to the operating temperature of the storage cabinet, the method of operation which comprises maintaining the temperature of the cooling element periodically above and below 32° F., maintaining the temperature of the cabinet between 35° and 40° F. and circulating air over said cooling element and through said cabinet at a velocity of approximately 30 feet per minute.

10. In a refrigerator in which the cooling element is designed for operation at a temperature close to the operating temperature of the storage cabinet, the method of operation which comprises operating the cooling element at temperatures between 29° and 35° F., maintaining the temperature of the cabinet between 35° and 40° F. and circulating air over said cooling element and through said cabinet at a velocity of approximately 30 feet per minute.

11. The method of operating a refrigerator in which the food storage cabinet is cooled by a cooling element which comprises maintaining the temperature of the air in said cabinet between 35° and 40° F. and maintaining the temperature of the cooling element sufficiently close to the temperature of the air in said cabinet to produce a relative humidity of the air in said cabinet from 80 to 85 per cent.

12. The method of operating a refrigerator in which the food storage cabinet is cooled by circulating air over a cooling element and through said cabinet which comprises operating said cooling element at temperatures between 29° and 35° F. and circulating the air in said cabinet over said cooling element at velocities sufficient to produce a temperature of the air in said cabinet between 35° and 40° F.

13. The method of operating a refrigerator in which the food storage cabinet is cooled by circulating air over a cooling element and through said cabinet which comprises operating said cooling element periodically above and below 32° F. and circulating the air in said cabinet over said cooling element at velocities sufficient to produce a temperature of the air in said cabinet between 35° and 40° F.

14. The method of operating a refrigerator in which the food storage cabinet is cooled by circulating air over a cooling element and through said cabinet which comprises maintaining the temperature of the air in said cabinet between 35° and 40° F. and maintaining the temperature of the cooling element periodically above and below 32° F. and sufficiently close to the temperature of the air in said cabinet to produce a relative humidity of the air in said cabinet from 80 to 85 per cent.

RALPH E. KING.